Nov. 27, 1951         J. OSWALD         2,576,354

VEHICLE ROOF CONSTRUCTION

Filed Feb. 2, 1949

JOHN OSWALD
INVENTOR.

BY E. C. McRae
J. R. Faulkner
F. H. Oster

ATTORNEYS

Patented Nov. 27, 1951

2,576,354

UNITED STATES PATENT OFFICE 2,576,354

VEHICLE ROOF CONSTRUCTION

John Oswald, Detroit, Mich., assignor to Ford Motor Company, Dearborn, Mich., a corporation of Delaware Application February 2, 1949, Serial No. 74,114

2 Claims. (Cl. 296—137)

This invention relates generally to a vehicle roof construction, and has particular reference to that portion of a vehicle roof construction which includes the roof rail, roof panel, and drip molding.

It is customary both in passenger and commercial vehicles to provide a drip molding extending along the lower marginal edge of the roof panel on each side of the vehicle. Conventionally this drip molding extends over the doors and side windows and serves as a gutter to convey water running from the roof to points located forwardly and rearwardly of the doors and windows so as to protect the latter from water drainage which would form an impediment to clear vision through the windows and might also enter the car when the doors or windows are opened. In a construction used at present, the lower edge of the roof panel is bent inwardly to form a horizontal flange which is then spot welded to the horizontal flange of the drip molding and also to an adjacent flange of the roof rail. There are several disadvantages to this arrangement. The horizontal flange of the roof panel is difficult to form, requiring a cam die. The welding operation is difficult to perform since the welding gun must be operated from inside the vehicle and the clearances adjacent the flanges to be welded are small. In addition, the construction sometimes exposes a series of spot welds to the normal vision of a person entering the car, and is unsightly.

The foregoing and other disadvantages are overcome by the present construction, in which the lower edge of the roof panel is bent outwardly to provide an integral horizontal flange which may be easily formed by a simple stamping operation. This flange is then spot welded to a double thickness flange of a pre-assembled roof rail, and since the joint to be welded extends outwardly and has ample clearance both above and below, the spot welding operation is extremely simple and much faster and economical. At its outer edge, the two layers of the double thickness flange of the roof rail are bent upwardly and downwardly respectively to form a gutter to carry off water draining from the roof, and also to provide means for the attachment of a decorative trim molding which conceals the joint and forms part of the outer wall of the gutter. The molding not only enhances the appearance of the vehicle but readily lends itself to various styling motifs, since it may be formed of different cross sectional shapes to provide a different appearance and also may be painted or plated as desired. In addition, the molding conceals from normal vision the line of spotwelds used to secure the flanges together.

The foregoing and other objects and advantages of the present invention will be made more apparent as this description proceeds, particularly when considered in connection with the accompanying drawings, wherein.

Figure 1:
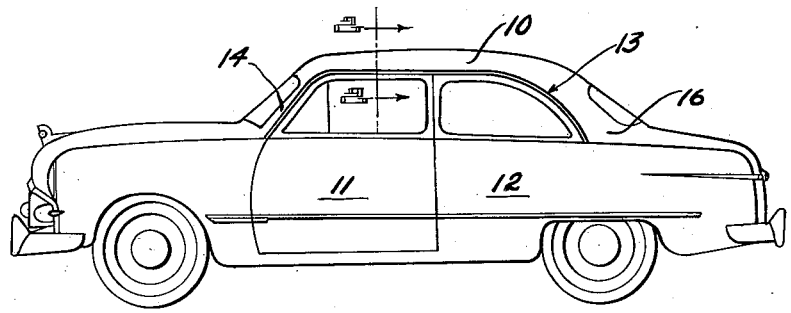
Figure 1 is a side elevational view of a vehicle embodying the present invention.

Referring now more particularly to the drawings, there is shown in Figure 1 a passenger car having a tudor type body. The reference character 10 indicates the roof panel, which is in the form of a one piece sheet metal stamping. The roof panel extends over the front door 11 and the side panel 12, each of which has a vertically slideable window mounted therein. Water draining from the roof panel 10 is caught in a gutter construction to be described more in detail later, and including a decorative trim molding 13. It will be noted from Figure 1 that the molding 13 extends generally horizontally over the front door 11 and the side panel 12, and forwardly and rearwardly thereof is inclined downwardly toward the belt line of the body. The forward portion of the trim molding 13 follows the front pillar 14, while the rearward portion of the molding extends along the rear quarter 16.

Figure 2:
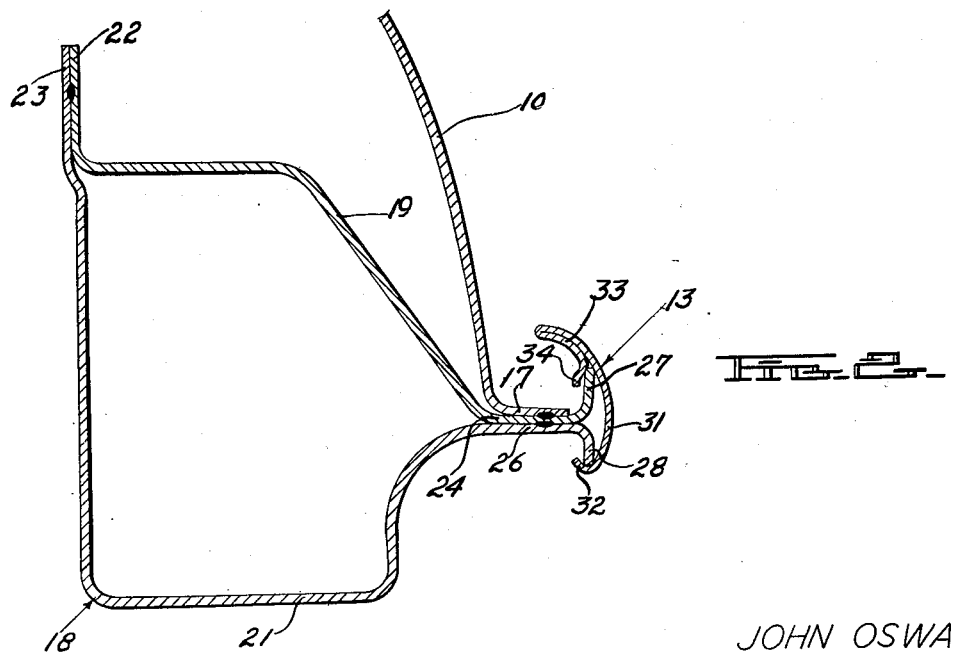
Figure 2 is an enlarged transverse cross sectional view taken substantially on the plane indicated by the line 2—2 of Figure 1.

Figure 2 illustrates a typical section through the roof panel and the gutter construction. The lower marginal edge of the roof panel 10 is formed with an integral horizontal outwardly extending flange 17. Inasmuch as the short horizontal flange 17 extends outwardly, it will be seen that it may be formed by a relatively simple stamping operation, as compared to the more difficult cam die operation necessary to form the usual flange which extends inwardly from the lower edge of the roof panel.

The roof panel is supported upon a longitudinally extending roof rail indicated generally by the reference character 18. The roof rail is generally of box shape in cross section and is formed of upper and lower sheet metal sections 19 and 21 respectively. The inner flanges 22 and 23 respectively of the upper and lower sections 19 and 21 of the roof rail are arranged in juxtaposition and are spot welded together. The outer flanges 24 and 26 respectively of the upper and lower sections 19 and 21 of the roof rail are also arranged in juxtaposition and extend horizontally. These flanges are likewise spot welded together. It will be noted from the drawing that the horizontal flange 24 of the upper section 19 of the roof rail is bent vertically upwardly adjacent its outer edge to form a short vertical flange 27, while the lower horizontal flange 26 of the lower section 21 of the roof rail is bent vertically downwardly to form a short vertical flange 28. The vertical flanges 27 and 28 are preferably but not necessarily in alignment with each other.

The pre-assembled roof rail 18 supports the roof panel 10. It will be noted that the outer inclined wall of the upper section 19 of the roof rail forms with its horizontal flange 24 and vertical flange 27 a generally channel shaped gutter within which is positioned the horizontal flange 17 of the roof panel 10. During the pre-assembly of the upper and lower sections of the roof rail to each other the horizontal flanges 24 and 26 are tacked together by a series of relatively widely spaced spot welds. During the assembly of the roof panel to the roof rail the roof panel flange 17 is spot welded to the flanges 24 and 26 of the roof rail by a series of closely spaced spot welds, which serve not only to secure the roof panel to the roof rail but also to strengthen the joint between the upper and lower sections of the roof rail.

It will be noted from the foregoing that a relatively simple roof construction is provided which is easily fabricated and assembled. Not only is the roof panel 10 a relatively simple stamping, but the spot welding operation securing the flange 17 of the roof panel to the flanges 24 and 26 of the roof rail is one which may be performed rapidly and efficiently. These flanges extend outwardly and hence are readily accessible to a welding gun, and the latter may be guided along the channel or gutter formed by the upper section of the roof rail and the roof panel.

While it would of course be possible to so form the outer flanges 27 and 28 of the roof rail that they would present a satisfactory appearance and could themselves comprise the drip molding, the present invention contemplates the provision of a decorative trim molding 13 which is adapted to snap over the vertical flanges 27 and 28 to conceal the latter and to present a styled appearance to the exterior of the vehicle. The trim molding 13 may have any desired exterior configuration and thus lends itself well to styling variations. In the present drawing it is shown as comprising an arcuate outer wall 31, an inturned lower rolled edge 32 and an upper return bend flange 33. The upper return bend flange 33 lies closely adjacent the outer wall 31 of the molding to form a double thickness section at the upper portion thereof, and then diverges from the outer wall 31 to form a retaining flange 34 extending downwardly from the return bend flange 33.

The trim molding 13 is assembled to the flanges 27 and 28 of the roof rail by first placing the molding over the upper vertical flange 27 so that the latter is positioned in the longitudinal groove formed between the outer wall 31 of the molding and the retaining flange 34. It is then only necessary to exert an inward pressure upon the central portion of the outer wall 31 of the molding to snap the lower rolled edge 32 of the molding over the downwardly depending vertical flange 28 of the roof rail. In the assembled position the trim molding 13 is under a slight stress so as to resiliently hold the latter in place upon the roof rail and prevent rattles and squeaks.

It will be apparent from the drawing that the trim molding 13 not only conceals the flanges 27 and 28 of the roof rail and the joint therebetween, but that the upper flange 33 of the molding extends sufficiently far inwardly to conceal from normal view the spot welds joining the flanges 17, 24 and 26 together. In addition, the flange 33 of the molding cooperates with the roof panel and upper section of the roof rail to form a gutter of such shape and size as to adequately carry off all water draining from the roof panel.

The trim molding 13 on each side of the vehicle may be formed in one piece to present a unitary appearance. Likewise the roof rail 18 on each side may be formed of upper and lower sections 19 and 21 extending the entire length of the roof, but if desired the roof rail may be divided into forward and rearward sections with the joint located at the junction between the front door 11 and the body panel 12 so that the joint may be concealed from view.

It will be understood that the invention is not to be limited to the exact construction shown and described, but that various changes and modifications may be made without departing from the spirit and scope of the invention, as defined in the appended claims.

What is claimed is:

1. In a vehicle roof construction, a longitudinally extending roof rail formed of two stampings secured together, said stampings having horizontal flanges extending outwardly therefrom in juxtaposition and secured to each other, a roof panel having a generally horizontal flange extending outwardly therefrom and joined to the aforesaid horizontal flange of the upper of said roof rail sections, and the flange of the upper section of said roof rail being bent upwardly adjacent its outer edge to form with said roof panel a channel shaped gutter.

2. In combination with a vehicle roof rail formed of two sections having outwardly extending horizontal flanges secured together with the outer edge of the upper flange bent upwardly to form a gutter and with the outer edge of the lower flange bent downwardly, a decorative molding strip mounted upon the upwardly and downwardly bent portions of the flanges of the upper and lower sections respectively of the roof rail, said molding strip having an outer wall concealing said flanges from normal view and retaining flanges at the upper and lower edges of said molding strip adapted to snap over the upwardly and downwardly extending portions of the flanges of said roof rail sections to hold the molding strip thereon.

JOHN OSWALD.

REFERENCES CITED

The following references are of record in the file of this patent:

UNITED STATES PATENTS

| Number | Name | Date |
| --- | --- | --- |
| 1,670,465 | Marshall | May 22, 1928 |
| 1,703,939 | Kellogg | Mar. 5, 1929 |
| 1,720,904 | Kellogg | July 16, 1929 |
| 2,205,797 | Ledwinka | June 25, 1940 |
| 2,248,319 | Waterhouse | July 8, 1941 |
| 2,319,723 | Crowe et al. | May 18, 1943 |